United States Patent [19]
Koczy

[11] Patent Number: 5,185,078
[45] Date of Patent: Feb. 9, 1993

[54] SEPARATOR APPARATUS AND METHOD FOR REGENERATING EMULSIONS WITH DOWNSTREAM MONITORING FILTER

[75] Inventor: Bernhard Koczy, Mettmann, Fed. Rep. of Germany

[73] Assignee: Henkel Kommanditgesellschaft auf Aktien, Duesseldorf-Holthausen, Fed. Rep. of Germany

[21] Appl. No.: 768,872
[22] PCT Filed: Apr. 17, 1990
[86] PCT No.: PCT/EP90/00599
§ 371 Date: Oct. 23, 1991
§ 102(e) Date: Oct. 23, 1991
[87] PCT Pub. No.: WO90/12635
PCT Pub. Date: Nov. 1, 1990

[30] Foreign Application Priority Data
Apr. 24, 1989 [DE] Fed. Rep. of Germany ....... 3913386

[51] Int. Cl.⁵ .............................................. B01D 37/04
[52] U.S. Cl. ...................... 240/741; 210/90; 210/93; 210/100; 210/108; 210/791
[58] Field of Search .................. 210/90, 93, 108, 141, 210/143, 741, 791, 435, 459, 798, 100, 112, 167, 259

[56] References Cited
U.S. PATENT DOCUMENTS

| | | | |
|---|---|---|---|
| 3,804,758 | 4/1974 | Cooper et al. | 210/741 |
| 4,107,037 | 8/1978 | Cavanaugh et al. | 210/90 |
| 4,276,181 | 6/1981 | Cordier et al. | 210/741 |
| 4,332,679 | 6/1982 | Hengst et al. | 210/90 |
| 4,822,484 | 4/1989 | Prendergast et al. | 210/137 |

FOREIGN PATENT DOCUMENTS

| | | | |
|---|---|---|---|
| 3523907 | 1/1987 | Fed. Rep. of Germany | 210/741 |
| 2810306 | 11/1987 | Fed. Rep. of Germany | 210/741 |

OTHER PUBLICATIONS

Ullmann's Enzyklepeedie der Techmischen chemie, Verlag Chemie, Weinheim 1976, 4th Edition, vol. 2, pp. 217-220 (German original and English translation).

Primary Examiner—Robert A. Dawson
Assistant Examiner—Joseph Drodge
Attorney, Agent, or Firm—Ernest G. Szoke; Wayne C. Jaeschke; Kenneth Watov

[57] ABSTRACT

A separator for regenerating used emulsions from cooling lubricants or cleaning solutions, for example, includes a discharge pipe for discharging the regenerated emulsion. The time between two sediment clearance processes is increased without adversely affecting the quality of the regenerated emulsion from the separator by including a fine filter arranged in the discharge pipe to retain residual solids. A measuring device for measuring the pressure difference between the inlet port and the outlet port of the fine filter generates a signal whenever a predetermined pressure difference is exceeded. The fineness filter and the predetermined pressure difference correspond to a predetermined emulsion quality.

11 Claims, 2 Drawing Sheets

SEPARATOR APPARATUS AND METHOD FOR REGENERATING EMULSIONS WITH DOWNSTREAM MONITORING FILTER

BACKGROUND

1. Field of the Invention

This invention relates generally to separator apparatus, and more particularly to a separator for purifying spent emulsions, such as cooling lubricants, or cleaning solutions, for example.

2. Discussion of Related Art

One example of such a separator can be found in Ullmanns Enzyklopadie der technischen Chemie, Verlag Chemie, Weinheim 1976, 4th Edition, Vol. 2, pages 217 to 220. Such separators are used for purifying or cleaning contaminated and spent emulsions, by removing therefrom foreign oils, finely disbursed solids, and other contaminants. Examples of emulsions so cleansed are cooling lubricants, cleaning solutions, and other types of emulsions. In the removal or separation process in such separators, the spent emulsion is processed to separate therefrom foreign oil, and sludge. Accumulated sludge must be periodically removed. In self-emptying separators the sludge is automatically removed or discharged by periodic flushing of the associated separator drum. Flushing times are typically empirically determined. In non-self-emptying separators, the sludge or solids must be manually removed from the separator drum, after periods of operating time that are typically determined via trial and error.

Since, in self-emptying separators, the emptying time is empirically determined and the operation of the separator must not be adversely affected by variations in the solids component, even at high solids concentrations, the capacity of the separator to accommodate the solids cannot be utilized and the separator has to be prematurely emptied for safety reasons. The solids filling capacity of the separator drum is therefore utilized to only a minimal extent.

If, on the other hand, a non-self-emptying separator fully laden with sludge is left to continue operating, the liquid, for example the cooling lubricant emulsion, is returned without effective purification to the machine to be cooled and lubricated.

Both these state-of-the-art separator systems have the disadvantage that any other malfunction of the separator or the system as a whole, which adversely affects the effectiveness of the separator, is neither detected nor indicated.

3. Summary of the Invention

An object of the invention is to provide an improved separator for purifying or cleaning contaminated and spent emulsions.

Another object of the invention is to provide an improved separator capable of operating for extended periods of time without requiring the emptying of sludge from the drum, while maintaining the quality of the regenerated emulsion throughout the extended operating time.

Another object of the invention is to increase the reliability of separators for regenerating spent emulsions.

In a separator of the type mentioned at the beginning, this problem is solved by a fine filter arranged in the outlet pipe for retaining residual solids, and means for measuring the pressure difference between the entrance and exit of the fine filter, and for generating a signal if a predetermined pressure difference is exceeded. The fineness of the fine filter and the predetermined pressure difference correspond to the predetermined quality of the emulsion.

Although processes for separating emulsions and solids are known from DE 35 23 907 Al, US 4,822,484, DE 28 10 306 C2, according to which the quality of separation of the emulsion into its constituents is monitored and automatically controlled by measurement of various physical parameters of the emulsion or one of its constituents, for example density, viscosity, conductivity, in conjunction with the use of centrifuges or hydrocyclones, measurement of the pressure difference at a filter is not used in any of these patents to monitor and control separation of the emulsion.

According to the invention, the quality of the emulsion flowing off from the separator is monitored, and any reduction in quality is detected by the generation of a signal. The fineness of the fine filter and the predetermined pressure difference can be empirically determined. The basis of one embodiment of the invention is that the residual solids which are not separated in the separator drum are retained by the fine filter so that the permeability of the filter decreases. This reduction in permeability is detected by measurement of the pressure difference.

After each response of the measuring arrangement, the fine filter has to be cleaned or the filter cartridge replaced. Accordingly, a backwashing unit actuated by the signal from the measuring means for automatically backwashes the fine filter. This is because the fine filter can be cleaned during operation without the separator drum having to be switched off.

Although it is known from the book "Messen und Regeln in der Chemischen Technik (Measurement and Control in Chemical Engineering)", edited by F. Hengstenberg, B. Sturm and O. Winkler, Springer Verlag, Berlin 1964, page 1428, that the pressure drop at a filter can be measured for the purpose of controlling physical/chemical equipment by compressed air (the filter is used to pick up unwanted particles of dirt present in the compressed air), the manometers incorporated in the system are only used for rapid testing of the pressure and not for indicating fouling of the filter.

An indicator actuated by the signal from the measuring means is also included for indicating that the separator has typically emptied of sludge. A sludge emptying operation to be carried out much earlier on safety grounds is avoided.

In a self-emptying separator, it is of further advantage if the sludge emptying operation is initiated by the signal from the measuring means. In a non-self-emptying separator, the separator is switched off by the signal from the measuring arrangement. In such a case, the separator has to be emptied by hand.

In another embodiment of the invention, a delay circuit is incorporated in the measuring means so that, after the separator has started up, the measuring means can be switched on after a certain interval. This is because, when the separator drum is started up, any residual soil present is discharged which would lead to an increase in pressure at the fine filter and hence to a false signal from the measuring arrangement. Such false alarms or signals are avoided by the above-mentioned measure. The time interval in question may be about five minutes.

Another advantage of the separator according to the invention is that malfunctions adversely affecting the quality of the emulsion are recorded irrespective of their cause.

BRIEF DESCRIPTIONS OF THE DRAWINGS

Various embodiments of the invention are described in detail below with reference to the accompanying drawings, in which like items are identified by the same reference designation, wherein.

DETAILED DESCRIPTION OF THE INVENTION

Figure 1:
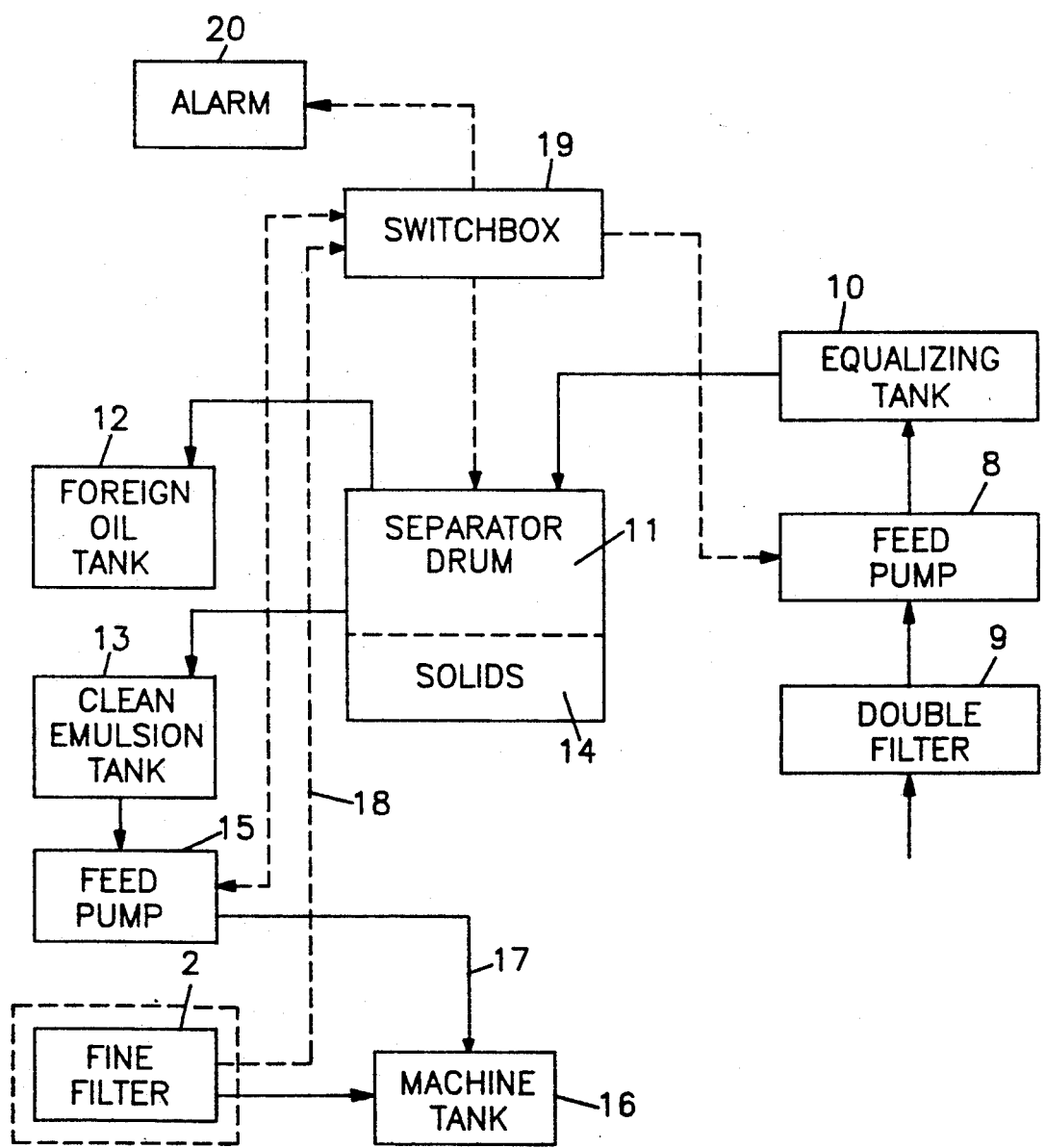
FIG. 1 is a block diagram of one embodiment of the separator according to the invention.

Referring to FIG. 1, the spent emulsion is pumped by a feed pump 8 through a double filter 9 into an equalizing tank 10 from which it passes to the separator drum 11. In the separator drum 11, the spent emulsion is separated into several phases, namely into foreign oil, which flows off into the foreign oil tank 12, and clean emulsion which flows off into the clean emulsion tank 13. The solids 14 remain in the separator drum 11.

From the clean emulsion tank 13, the regenerated emulsion is pumped by a second feed pump 15 through the fine filter 2 into the machine tank 16 from where it can be reused. If the fine filter 2 is cleaned or backwashed, the clean emulsion can be directly pumped into the machine tank via a bypass around the fine filter 2.

If the quality of the regenerated emulsion deteriorates and its solids content increases, the fine filter 2 retains the solids. If a certain pressure difference is exceeded at the fine filter, the measuring arrangement—not specifically shown in FIG. 1—transmits a signal through the line 18 to a switchbox 19, which in turn initiates emptying of the separator drum 11 and cleaning of the fine filter 2. Thereafter separation can continue. In addition, to increase safety, the switchbox 19 actuates the the an alarm 20, whenever a measuring device 3 generates a signal.

The ancillary unit according to the invention for monitoring the effectiveness of the separator is shown particularly clearly by chain lines in FIG. 1.

Figure 2:
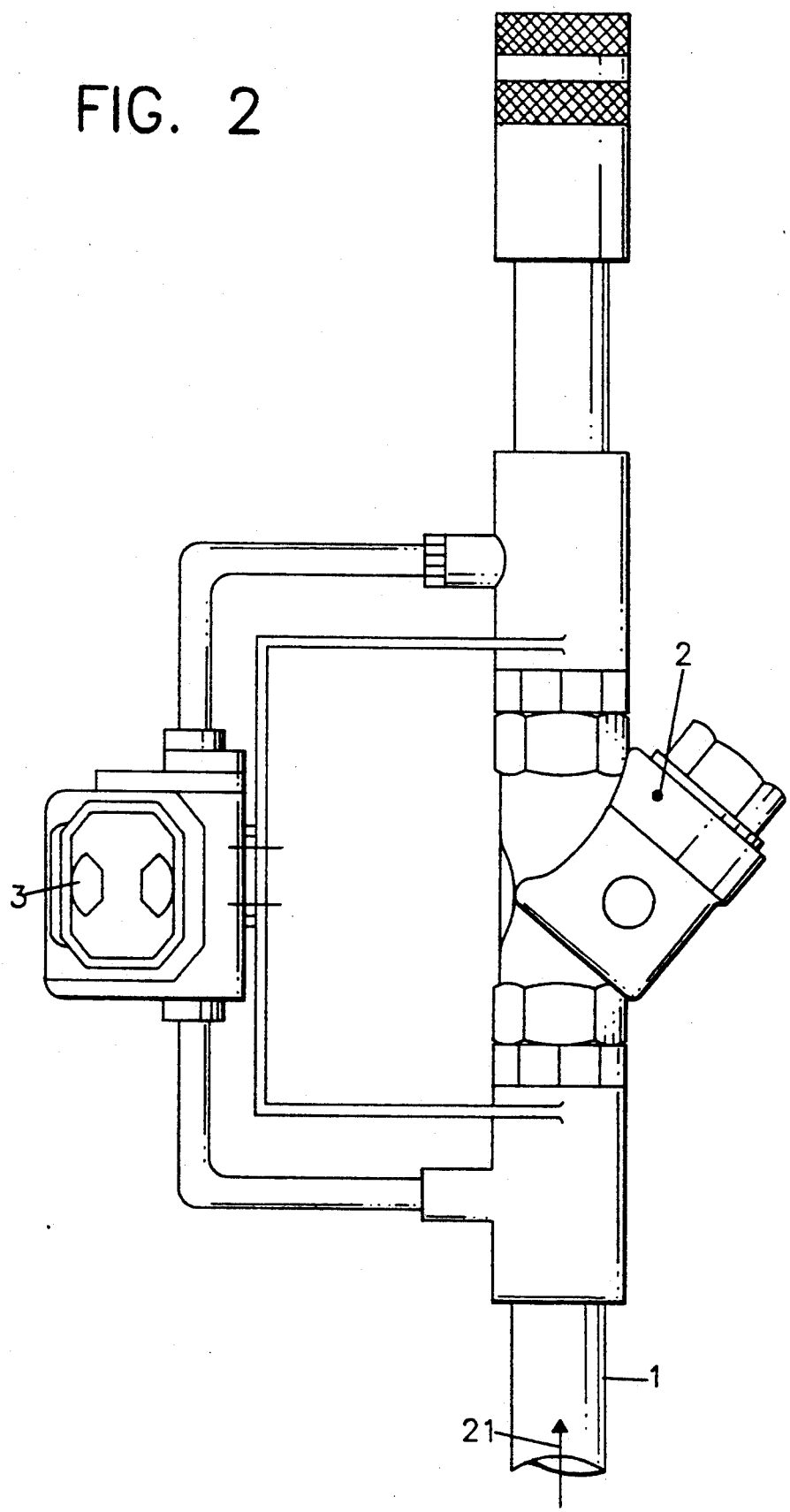
FIG. 2 is a plan view of the outlet pipe of a separator according to the invention with the fine filter and the measuring arrangement.

FIG. 2 is a plan view of an actual embodiment of the ancillary unit according to the invention for monitoring the effectiveness of a separator. A fine filter 2 is installed in the outlet pipe 1, being bridged by an arrangement or device 3 for measuring pressure differences. The measuring device 3 may be a mechanical pressure difference indicator or even an electrical or other system. The direction of flow is indicated by the arrow 21.

LIST OF REFERENCE NUMERALS

1 Outlet pipe
2 Fine filter
3 Measuring arrangement
4 Entrance
5 Exit
6 Backwashing unit
7 Indicator
8 Feed pump
9 Double filter
10 Equalizing tank
11 Separator drum
12 Foreign oil tank
13 Clean emulsion tank
14 Solids
15 Feed pump
16 Machine tank
17 Bypass
18 Line
19 Switchbox
20 Alarm
21 Arrow

What is claimed is:

1. A separator having means for separating an emulsion from accumulated foreign oil and sludge of a liquid mixture, and further including an outlet pipe arranged to direct separated clean emulsion from said separator for reuse, and means for emptying sludge, wherein the improvement comprises an ancillary unit for monitoring the effectiveness of the separator, said ancillary unit including a filter arranged in said outlet pipe for retaining residual solids, and means for measuring the pressure differences between the entrance and exit of the filter and generating a signal if a predetermined pressure difference is exceeded, whereby the porosity of the filter and the predetermined pressure difference correspond to a predetermined quality of the emulsion, said ancillary unit further including means responsive to the generating of said signal from said measuring means for turning off said separator.

2. A separator as claimed in claim 1, further including a backwashing unit actuated by said signal from said measuring means for automatically backwashing the filter.

3. A separator as claimed in claim 2, further including an indicator actuated by said signal from said measuring means for indicating the predetermined pressure difference has been exceeded.

4. A separator as claimed in claim 1, further including an indicator actuated by said signal from said measuring means for indicating the predetermined pressure difference has been exceeded.

5. A separator as claimed in claim 1, further including means responsive to said signal from said measuring means, for operating said sludge emptying means.

6. A separator as claimed in claim 1, further including delay means for turning on said measuring means a predetermined period of time after said separator is turned on.

7. In a separator having means for separating an emulsion from accumulated foreign oil and sludge of a liquid mixture, and further including an outlet pipe arranged to direct separated clean emulsion from said separator for reuse, and a filter arranged in said outlet pipe for retaining residual solids, a method for monitoring the effectiveness of the separator, comprising the steps of:
    measuring the pressure difference between an entrance port and an exit port of said filter;
    generating a signal if a predetermined pressure difference is exceeded, for indicating a deterioration in the effectiveness of said separator; and
    turning on an alarm upon the generating of said signal.

8. The method of claim 7, further including the step of backwashing said filter in response to said signal.

9. The method of claim 7, further including the step of turning off said separator in response to the generating of said signal.

10. The method of claim 7, further including the step of delaying until a predetermined period of time after the turn on of said separator the initiation of said measuring and generating steps.

11. The method of claim 7, wherein said separator further includes means for emptying sludge, and said method further includes the step of operating said sludge emptying means in response to the generating of said signal.

* * * * *